(12) United States Patent
Dames (10) Patent No.: US 7,231,126 B2
(45) Date of Patent: Jun. 12, 2007

(54) FLEXURE ARRANGEMENTS (76) Inventor: Andrew Nicholas Dames, 74 Defreville Avenue, Cambridge (GB) CB4 1HU ( * ) Notice: Subject to any disclaimer, the term of this patent is extended or adjusted under 35 U.S.C. 154(b) by 174 days.

(21) Appl. No.: 10/516,046

(22) PCT Filed: Jun. 4, 2003

(86) PCT No.: PCT/GB03/02413

§ 371 (c)(1),
(2), (4) Date: Nov. 29, 2004

(87) PCT Pub. No.: WO03/104872

PCT Pub. Date: Dec. 18, 2003

(65) Prior Publication Data

US 2005/0201712 A1    Sep. 15, 2005

(30) Foreign Application Priority Data

Jun. 5, 2002    (GB) .................................. 0212817.1

(51) Int. Cl.
G02B 6/00    (2006.01)
G02B 6/26    (2006.01)
(52) U.S. Cl. ......................................  385/137; 385/52
(58) Field of Classification Search ................ 385/137, 385/52
See application file for complete search history.

(56) References Cited

U.S. PATENT DOCUMENTS

| 4,382,709 A | 5/1983 | Brown |
| 4,542,956 A | 9/1985 | McCrickerd |
| 5,411,235 A | 5/1995 | Rumbaugh |
| 5,594,820 A * | 1/1997 | Garel-Jones et al. .......... 385/22 |
| 5,648,618 A | 7/1997 | Neukermans et al. |
| 5,859,947 A * | 1/1999 | Kiryuscheva et al. ....... 385/136 |
| 6,005,998 A | 12/1999 | Lee |
| 6,049,407 A | 4/2000 | Melville |
| 6,449,079 B1 | 9/2002 | Herrmann |
| 2003/0128912 A1 | 7/2003 | Dames et al. |

FOREIGN PATENT DOCUMENTS

| EP | 0 905 801 A2 | 3/1999 |
| WO | WO 02/46825 A1 | 6/2002 |

\* cited by examiner

*Primary Examiner*—Frank G. Font
*Assistant Examiner*—Jerry Martin Blevins
(74) *Attorney, Agent, or Firm*—Workman Nydegger (57) ABSTRACT

A flexure arrangement, suitable for use with or as part of, e.g., an optical beam steering arrangements, and intended for supporting and transmitting movement to any appropriate element, the arrangement including a first flexure to which movement is applied, a second flexure which attaches the arrangement to any appropriate supporting structure, structure linking the first flexure to the second flexure and structure for receiving any appropriate element, the first and second flexure being appropriately spaced so that any movement applied to the first flexure is amplified by the flexure arrangement.

18 Claims, 10 Drawing Sheets

FLEXURE ARRANGEMENTS

BACKGROUND TO THE INVENTION

The present invention relates to flexure arrangements, suitable for use with or as part of e.g. an optical beam steering arrangement, and intended for supporting and transmitting movement to any appropriate element.

The closest prior art known to the applicant is disclosed in PCT/GB01/00062 which is one of the applicant's own patent applications.

One of the objectives of the invention is to further improve beam steering arrangements which are capable of being assembled to form optical switches with a large number of input and output ports while being of minimal sizes. The invention aims therefore to further improve the compactness of beam steering arrangements.

Another objective of the invention is to render the arrangements simple to manufacture and assemble. In order to achieve this, reducing the complexity of an optical switch is an important consideration.

A further objective of the arrangements with which this invention is concerned is to provide an even further accurate steering facility to achieve higher quality switching.

A particular objective of the inventive arrangements is to achieve a greater angular swing of any element destined to be displaced by the arrangements which is far greater than the movement applied to the arrangement. Achieving an enhanced scale of amplification of movement will be an important factor in achieving the objective of compactness mentioned above.

Other considerations such as longevity and costs are also taken into account in the design of these arrangements.

One of the objectives of this invention is to provide a reduction of the beam actuators length as compared to the prior art system.

A further objective of the invention is to offer a new approach to providing the orientation and support of an optical element such as a collimator while achieving the required high level of accuracy and long term dependability.

An additional aim of the current invention is to improve the assembly of any individual components to the arrangement, thus rendering the arrangement altogether more practical.

A further objective of this invention is to present an improved kind of two dimensional (2D) piezoelectric actuator.

SUMMARY OF THE INVENTION

In its broadest independent aspect, the invention presents a flexure arrangement, suitable for use with or as part of e.g. an optical beam steering arrangement and intended for supporting and transmitting movement to any appropriate element, the arrangement comprising a first flexure means to which movement is applied, a second flexure means which attaches the arrangement to any appropriate supporting structure, means linking said first flexure to said second flexure and means for receiving any appropriate element, the first and second flexure being appropriately spaced so that any movement applied to said first flexure means is amplified by the flexure arrangement.

This arrangement is particularly advantageous in terms of amplifying the movement of the element when received by said receiving means. It also has advantageous vibrational and balancing properties.

In a subsidiary aspect in accordance with the broadest independent aspect of the invention, the flexure means are essentially parallel with respect to one another.

This particular feature is advantageous because it improves the mechanical properties of the arrangement.

In a further subsidiary aspect, the element is an optical element.

It is well known that precision is an essential requirement of optical communication systems, bearing this in mind, the advantages of the arrangement come to light in this particular application, because its implementation yields enhanced precision.

This structure has the particular benefits of improving the anti-vibrational characteristics of the arrangement, and of allowing the moments of inertia of the elements operating with the arrangement to be advantageously balanced.

In a further subsidiary aspect, the element is a collimator.

Due to the inherent shape of the collimator (usually being an elongate rod), the advantages of employing such an arrangement are particularly pertinent.

In a further subsidiary aspect, the first and second flexure means are spaced at a distance less than half the collimator's length. This allows advantageous amplification to occur when the element is a collimator.

In a further subsidiary aspect, the element is a reflective.

Some of the advantages put forward with regard to optical elements generally, are particularly pertinent to this configuration.

In a further subsidiary aspect, the element is a grating.

Similarly, to the previous configuration, using the flexure arrangement with a grating yields some of the advantages put forward with regard to optical elements generally.

In a further subsidiary aspect, the invention presents a beam steering arrangement, comprising a flexure arrangement in accordance with the broadest independent aspect, a collimator being the element with which it operates and actuating means for applying movement to the first flexure means, so that an actuator movement in any direction causes a collimator movement in the opposite direction, the relative moment of inertia of the actuator and collimator acting to counterbalance any externally induced movements.

In a further subsidiary aspect, the actuating means is a piezoelectric actuator which when actuated displaces two dimensionally. This feature is particularly advantages because it allows a lateral movement of the actuator to occur which is transmitted to the element as amplified angular motion.

In a further subsidiary aspect, the first flexure means is located upstream from the second flexure means. This provides the arrangement with advantageous mechanical properties.

In a further subsidiary aspect, any of the arrangement's components incorporate a slot extending from the periphery to an inward portion of said components, thereby facilitating the ready insertion and/or removal of an optical fibre.

This latest aspect of the invention is deemed to be particularly advantageous because it avoids having to thread an optical fibre through a series of apertures along the Z axis. This in turn enables a fibre to be rapidly inserted into the various components of the steering arrangement. Therefore, this aspect significantly simplifies the assembly of the steering arrangement.

In a further subsidiary aspect, any of the flexure means comprises a hole sufficient in diameter to allow the passage of an optical fibre and to avoid contact between the fibre and the or each of said means.

This is particularly advantageous because it avoids unwanted stress concentrations along the fibre itself at the flexure points where such stress concentrations could otherwise lead to premature fracture.

In a further subsidiary aspect, the support structure is an actuating means. This is particularly advantageous because it may render the arrangement altogether more compact.

In a subsidiary in accordance with the broadest independent aspect, the arrangement extends in the Z-direction, comprising at least a first and second actuating means, the first flexure means being at least in part the extremity of said first actuating means which extends in the Z-direction when actuated and the second flexure means being means located at the extremity of said second actuating means, thereby when the first beam is actuated, the collimator pivots.

The advantages of the arrangement of the preceding aspects are accentuated when the arrangement is incorporated in an optical switch

DETAILED DESCRIPTION OF THE INVENTION

Figure 1:
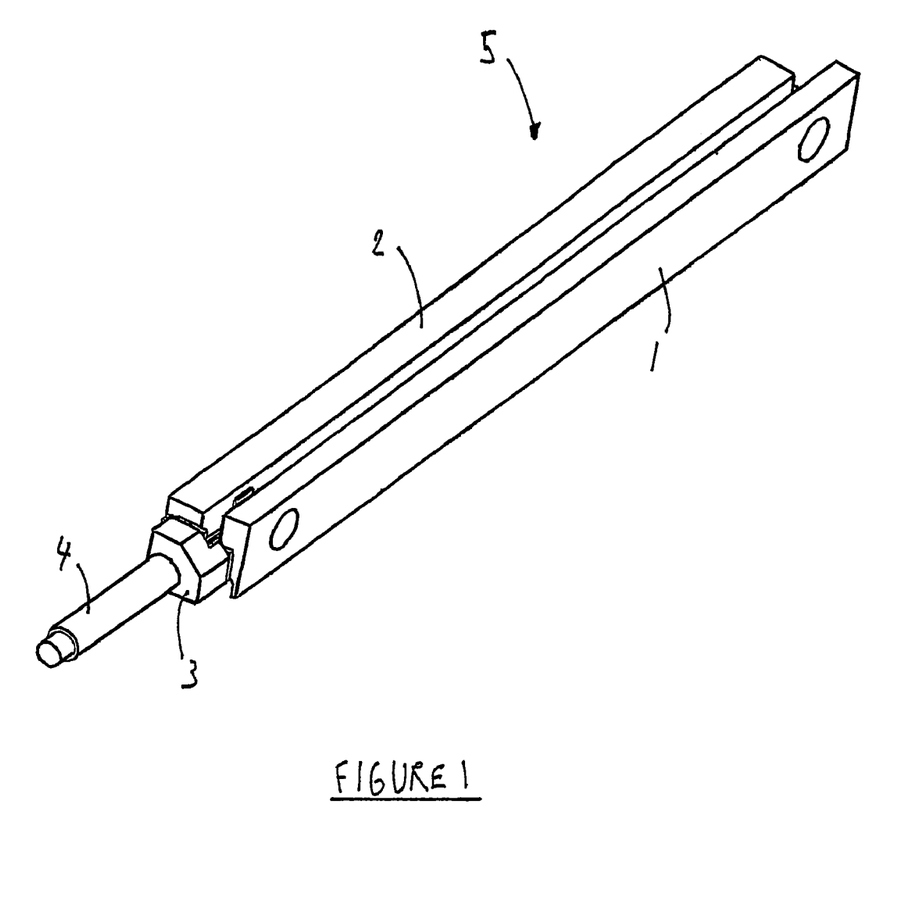
FIG. 1 shows a perspective view of a beam steering arrangement.

The device presented on FIG. 1 is designed to accommodate a single optical fibre and can be used interchangeably either as an input port or an output port in the context of either an input array or an output array.

The main components that constitute the beam steering arrangement presented in FIG. 1 are a support structure 1, an actuator 2, a flexure arrangement 3, a collimator 4 and an optical fibre (not shown in FIG. 1). The entire beam steering arrangement shown generally at 5 is particularly well adapted to be inserted into an optical switching system (described in more detail at a later stage in this patent application).

Figure 2:
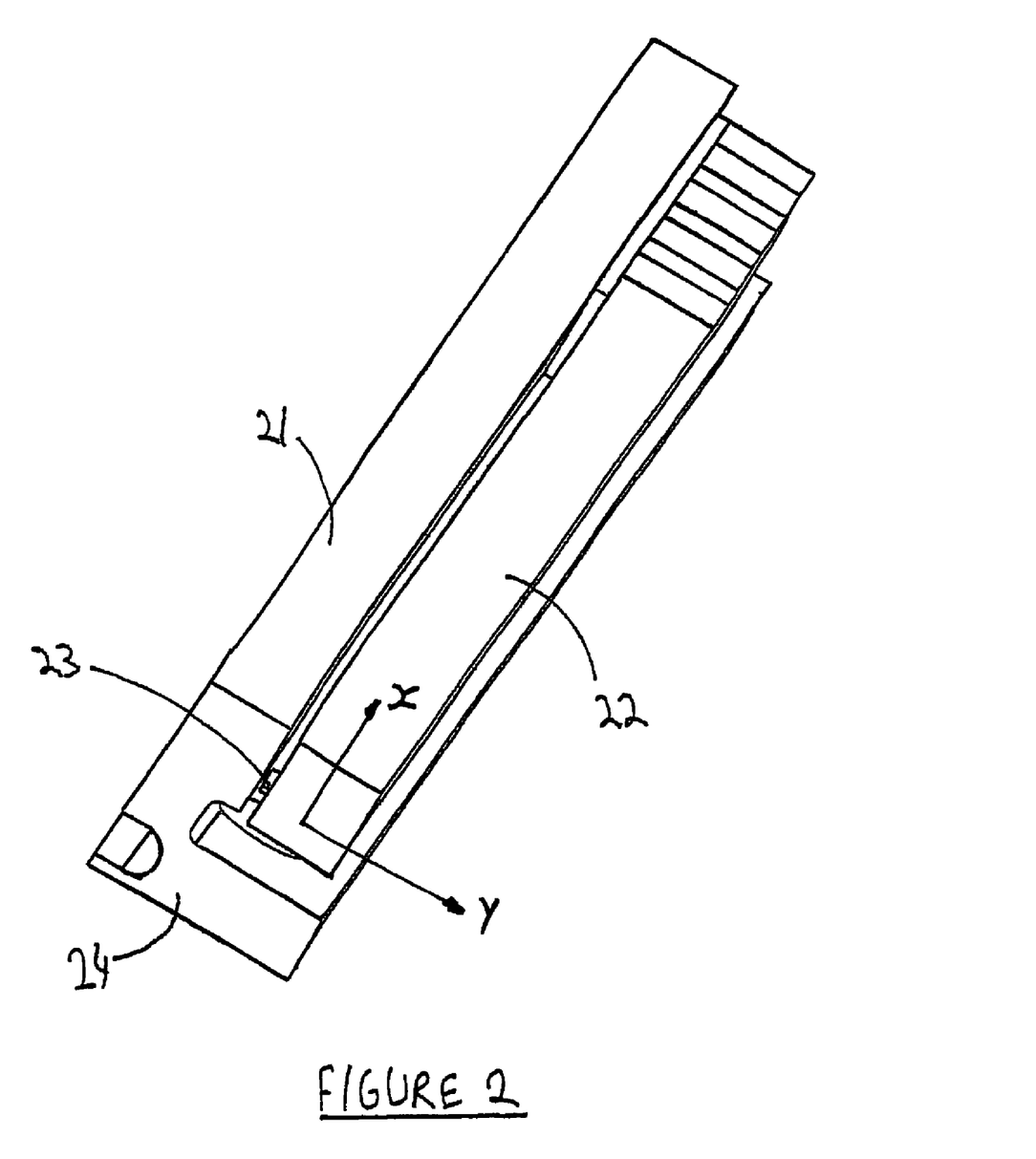
FIG. 2 shows a perspective view of the support structure with its actuator mounted therein.

FIG. 2 presents a support structure 21 with only the actuator 22. As can be seen on surface 24 the support structure, when viewed in cross section is L-shaped. The external sides of the L are preferably of equal length and measure approximately 4 mm. The actuator 22 takes the form of a beam whose cross-section measures approximately 1.8×1.8 mm. It is clamped to the support structure at one extremity over a length of approximately 10 mm. The unsupported length of the beam is of 31 mm which results in an overall length for the piezoelectric actuator of 41 mm.

There are also clearances between the beam 22 and the support structure 21 to allow the necessary displacement of the beam in any sideways direction and up and down. The piezoelectric actuator 22 is formed of layer of electrodes and piezoelectric material extending in the longitudinal direction and arranged so that there are no hollow portions through the actuator in order to be as compact as possible. The electrode and corresponding piezoelectric-layers are placed along the actuator essentially parallel to one another but divided in four separate portions of action to achieve bend in the X and Y directions.

Figure 3:
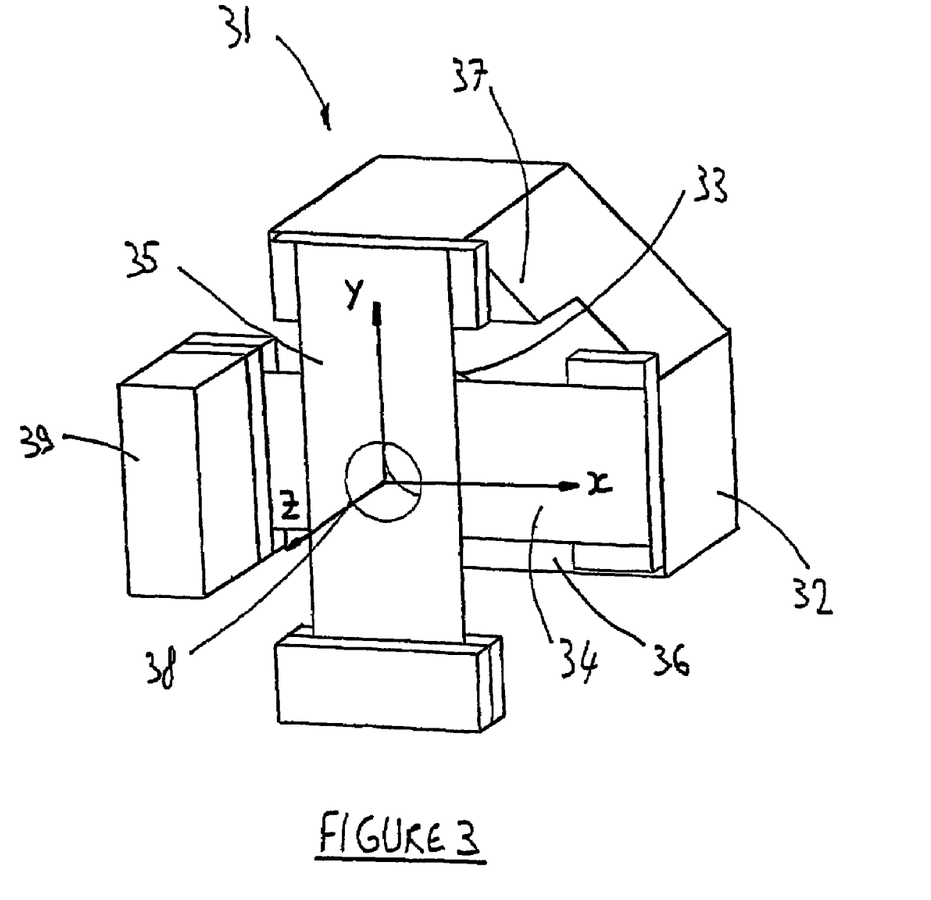
FIG. 3 presents a perspective rear view of the mount.

FIG. 3 presents at 31 a flexure arrangement viewed in perspective from the support structure side. The collimator receiving means 32 is provided with a bore 33 sufficient in diameter to receive an extremity of the collimator (not shown in the figure). While the diameter of the bore 33 can be selected to immobilise the collimator, additional means of attachment such as an epoxy resin may be employed to further secure the collimator to the mount 32. The inner face of mount 32 receives the extremities of flexures 34 and 35. These flexures are arranged orthogonal to each other and along the X and Y axes respectively.

Flexure 34 is attached at one of its extremities to the inner face 36 of the mount 32, while flexure 35 is attached at one of its extremities to step 37 which acts as part of the linking means defining the gap between flexure 34 and flexure 35. The means to fix the flexures to the mount 32 will be selected from known alternatives by the person skilled in the art.

These flexures are preferably 2.4 mm long, 1.2 mm wide and 0.025 mm thick. The material employed for these flexures is preferably Beryllium Copper which is an ideal selection for the purpose of these flexures due to the ductility of this material. An alternative preferred material is electroformed nickel. The separation between the flexures is approximately 0.75 mm.

The flexures are designed to bend (be compliant) in both flexure and torsion modes, and resist bending in both compression/stretch along the length and shear across the length. These properties allow the flexures to be located close together to constitute an efficient high gain 2D position to angle converter.

The position to angle gain of the structure is set by the gap between the flexures—i.e. a gap of 1 mm gives a gain of 1000 radians output angle per m of input travel. An efficient converter is one where only a small amount of mechanical energy is stored in the flexures when they flex and/or twist, thus avoiding unnecessary reduction in travel due to the finite stiffness of the input actuator, and where the stretch/compression and shear displacements of the flexures are also very small compared to the travel of the input actuator.

These second effects are especially important, as not only do they directly detract from the available input displacement, they also determine how close to the primary resonance of the structure (defined primarily by the stiffness of the input actuator and the mass of the moving parts) unwanted secondary resonances occur.

A well designed system will have secondary resonances 6 to 10 times higher than the primary resonance, the higher this number the cleaner the open loop response of the actuator, and the more tightly the actuator can be controlled in a feedback loop.

The magnitude of these effects is strongly driven by the position to angle gain aimed for—as the gain is increased (by moving the flexures closer together) the force to generate a given output torque (either static or to overcome angular inertia of the output device or collimator) increases; but also the change in output angle from any compression/ stretch or shear of the flexures in response to these forces also increases. Hence to maintain the same degree of loss of output or freedom from unwanted resonances as the gain is increased requires the resistance of the flexures to undesired distortion to increase as the square of the desired gain.

Returning to the specific description of FIG. 3, both flexures are provided with a central hole with a diameter of approximately 0.6 mm which can easily accommodate the fibre without the fibre coming into contact with the edges of the holes 38, particularly when the fibre is an SMF28 (single mode fibre 28) with a 250 µm acrylic jacket.

The fibre serves a mechanical purpose in the structure as well as carrying the light. It provides a constraint in the Z axis on the collimator, which otherwise would be free to move via the flexures deflecting in an S-shape. Provision of this constraint avoids a low frequency resonance form in this displacement mode.

The location of the fibre through the centre of the flexures means that the flexures are three or more times stiffer in resisting unwanted distortions from static and/or dynamic forces on the output device/collimator. This is because the flexures are prone to twist if the centre of the output load does not run along the centre line. In certain circumstances it may not be practical to do this, and the fibre should be placed beside (and as close as possible to) the flexures.

Flexure 34 incorporates at one extremity means to attach the flexure to the frame or support structure of the type which was described in detail with reference to FIGS. 1 and 2. These particular attachment means comprises an extension member 39.

With regards to flexure 35, it comprises at one of its extremities means to attach the flexure to the actuator (not illustrated in this figure).

Figure 4:
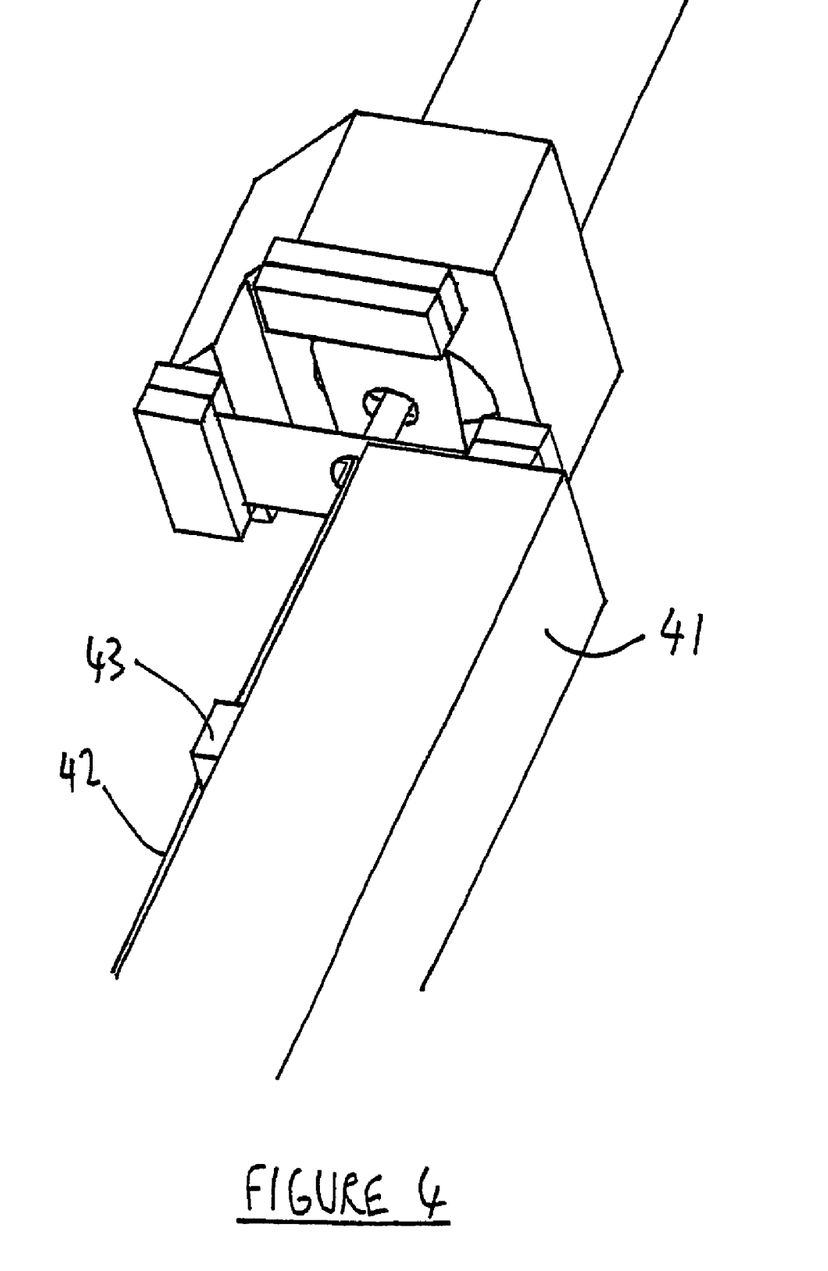
FIG. 4 shows a perspective rear view of the piezoelectric actuator, the optical fibre, the mount and a partial view of the collimator.

FIG. 4 shows in detail how the flexure arrangement described in FIG. 3 attaches to the free end of the actuator 41. This figure also shows the optical fibre 42 extending parallel to the actuator 41 and passing through both flexures to terminate in the collimator which can only be partly viewed in this figure. The means employed to fix the optical fibre 42 to the actuator 41 are provided and illustrated at 43. These means of attachment are preferably an epoxy resin of the type which would guarantee a reliable attachment between the fibre and the actuator through the numerous flexure cycles during the life of the beam steering arrangement. The optical fibre is preferably glued to the actuator 3 mm before the closest flexure and preferably terminates in the collimator 1 mm past the flexure furthest from the actuator.

The configuration discussed above with reference to FIGS. 1–4 is particularly advantageous because it has as its effective pivot for the collimator, the flexure which is fixed to the frame. This permits movement of the collimator about the X and Y axes which are orthogonal to the Z axis, the Z axis being the beam forming axis of the collimator. Since this collimator pivots about that particular point, an advantageous beam swing can be obtained in operation while the translational movement of the collimator remains constrained.

Another advantageous mechanical property lies in the fact that while the actuator is displaced under the application of one or more drive signals, the actuator will bend in one direction causing the collimator to tilt in the opposite direction. This yields inertial balance, eliminates mechanical cross-coupling between multiple devices mounted to the same structure, and removes sensitivity to external vibration. This type of symmetry is particularly useful in eliminating the resonances and harmonics that are often troublesome with densely packed mechanical components operating at high frequencies. This configuration also has useful damping properties which further improve the quality and reliability of this particular beam steering arrangement.

Figure 5:
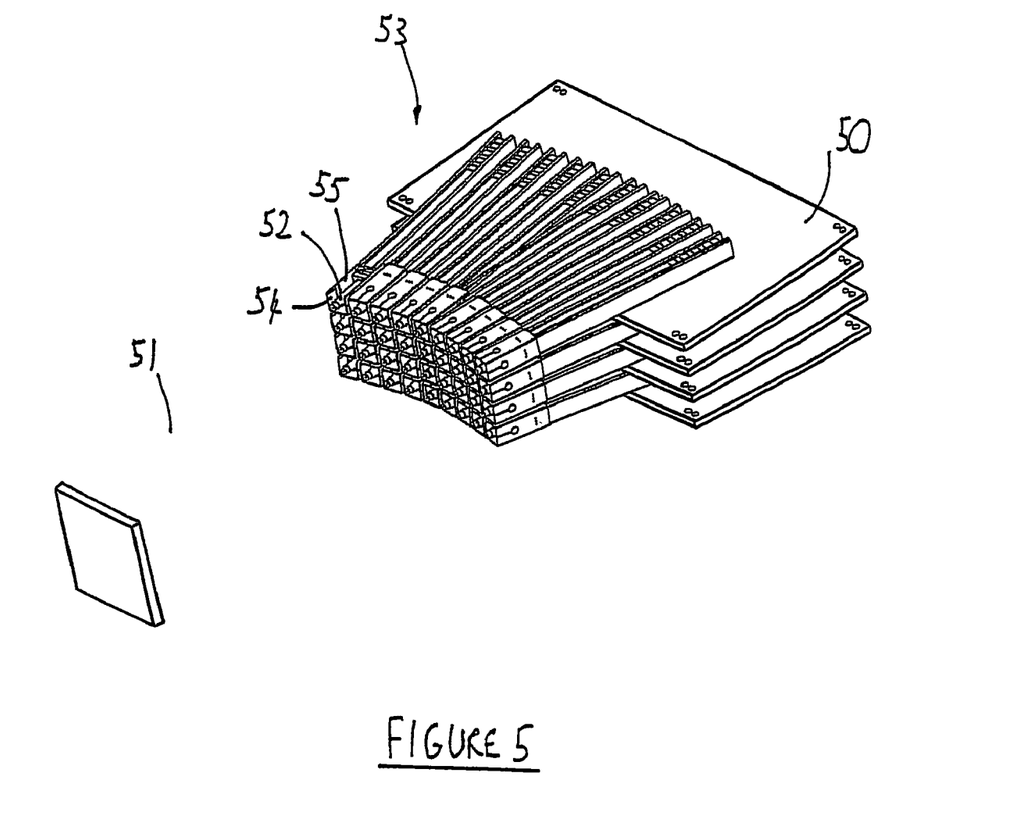
FIG. 5 presents a perspective view of an input or output array of a switching system.

FIG. 5 shows an array of beams steering arrangements incorporating a flexure arrangement or mount of the type described above and disposed as a radial array. The longitudinal axis of the actuators in each slice 50 is directed substantially towards the central actuator of an opposing slice in an opposing array (not illustrated in FIG. 5). Such a configuration minimises the need for additional deflection from optical systems in their deflection region referenced generally at 51. An additional advantage of this configuration is that a smaller range of angular movement at the collimator will suffice to steer a beam from any possible input to any possible output.

The array shown generally at 53 comprises 36 beam steering arrangements in a common support structure. Each collimator 52 can have 1.25 mm diameter, 1.65 mm diameter metal housing and be 10 mm long. The metal housing of the collimator should facilitate operation in conjunction with capacitive sensing means. These capacitive sensing means can be as illustrated in FIG. 5 incorporating housings 55 within which the collimator displaces and sensor plates 54 disposed at the free end of the collimator. These plates can be arranged to sense the movement of the end of the collimator in both the X and Y direction.

The position measurements obtained through these capacitive sensors can then be fed back into the switch systems control means.

Figure 6:
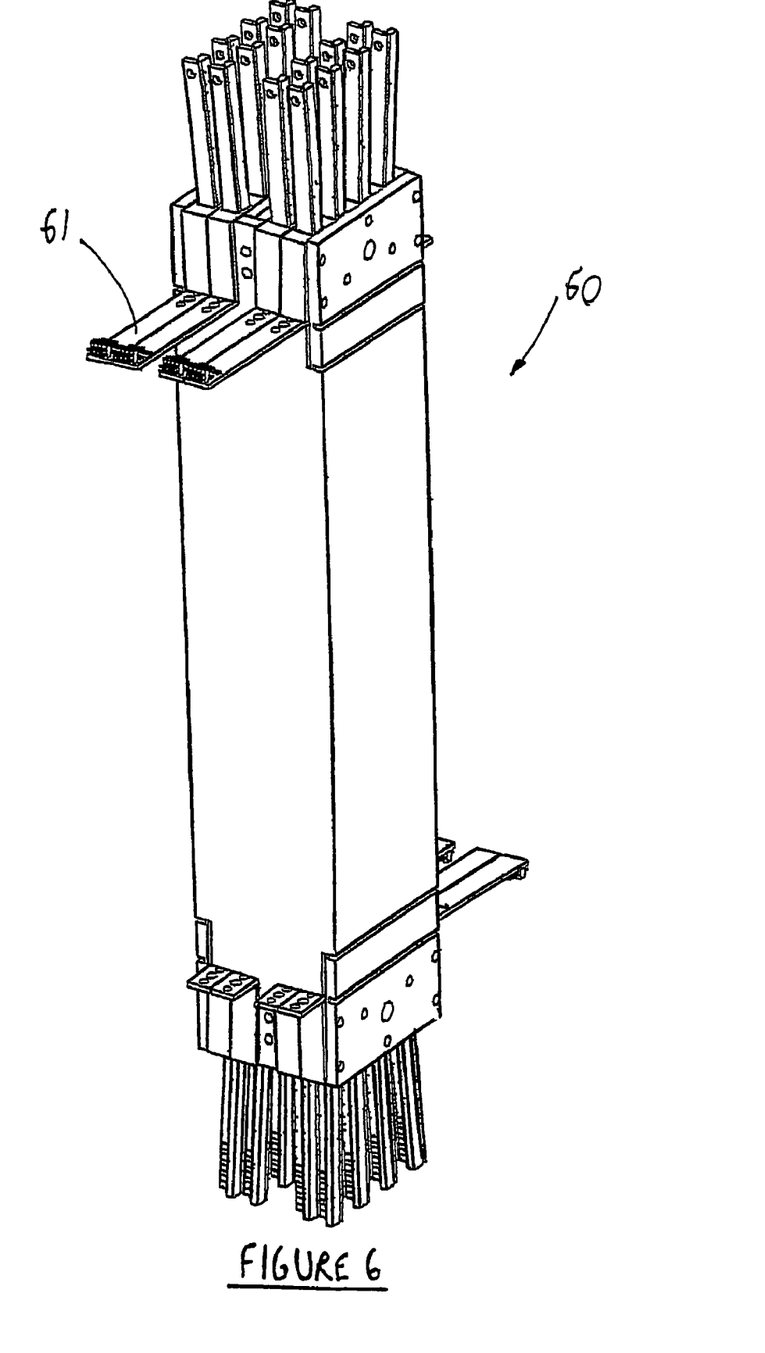
FIG. 6 shows an optical switch system of a further embodiment of the present invention.

A variation of these capacitive sensing means is illustrated in FIG. 6 which shows an input and output array for the switch system 60. Each slice of beam steering arrangements operates with a sensor board 61 which incorporates holes of approximately 3.4 mm square which carry sense electrodes on their sides. These sensor boards are about 1 mm thick. The capacitance to collimator (at the centre position) from each electrode is 0.025 pf. The sensitivity of the north/south capacitors (or the east/west capacitors) to the displacement at the centre point is approximately 0.05 ff/µm. Each centre of sensor board is placed at approximately 6.5 mm from the effective pivot of the collimator which is as discussed previously the flexure fixed to the frame.

Figure 7:
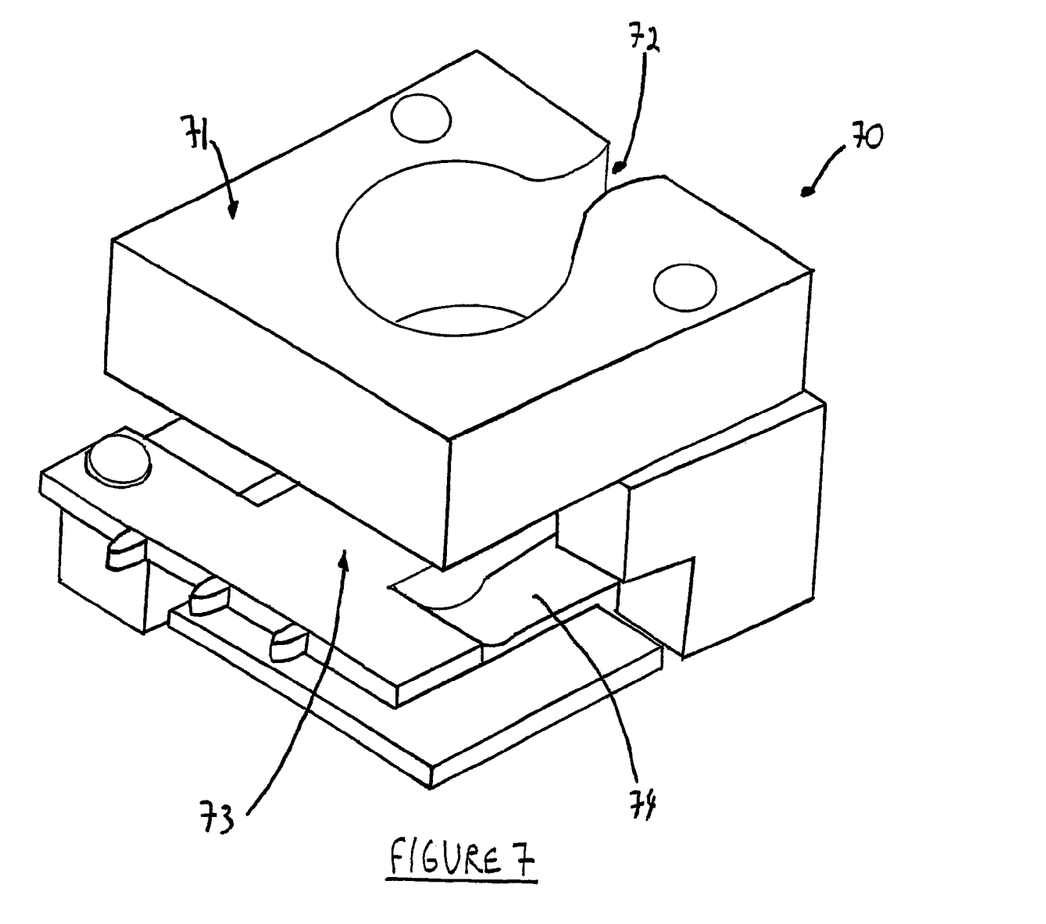
FIG. 7 shows a perspective view of a mount in accordance with a further embodiment of the present invention.

FIG. 7 illustrates a further embodiment of the flexure arrangement of the present application. The arrangement 70 comprises a collimator receiving means 71 in the form of a central bore which incorporates a slot 72 extending from the periphery to an inward portion of the receiving means. The slot 72 is sufficiently wide to allow the passage of an optical fibre.

The flexures 73 and 74 also have a slot extending from their periphery to an inward portion. These slots are preferably inline with slot 72 so as to even further simplify the assembly of the optical fibre and collimator to the arrangement 70. In order to achieve this, the flexure plates 73 and 74 have been disposed in parallel while their attachment means are adapted to achieve similar properties to the flexure arrangement illustrated in FIG. 3 which does not comprise any slots.

Figure 8:
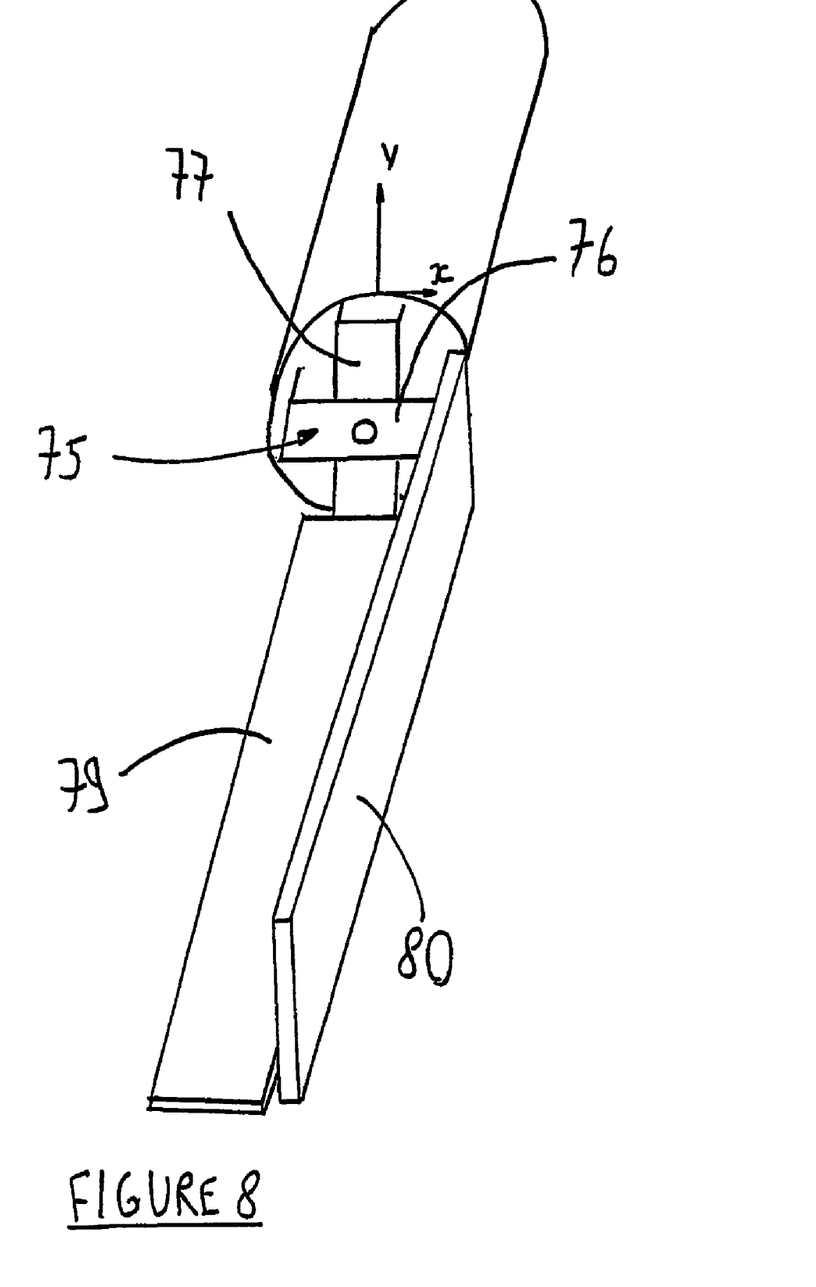
FIG. 8 shows a schematic perspective view of a further embodiment of the present inventive arrangement.

FIG. 8 presents a further flexure arrangement 75 comprising a first flexure 76 and a second flexure 77 both attaching collimator 78 at one extremity and their respective actuators 79 and 80. The attachment means of the actuators and the optical fibre have been omitted from the figure for clarity. Both actuators may be one-dimensional piezoelectric actuators such that for example when the actuator 80 is displaced in the X direction, the actuator 79 acts as the support structure of the preceding embodiments so that the collimator pivots and has an angular swing in the opposite direction to the movement of the actuator 80.

If both actuators 79 and 80 are actuated simultaneously or only actuator 77, the flexure and the collimator move in the same direction, thus the arrangement does not provide in this mode of operation the balancing of the kind obtained in the previous embodiments.

Figure 9:
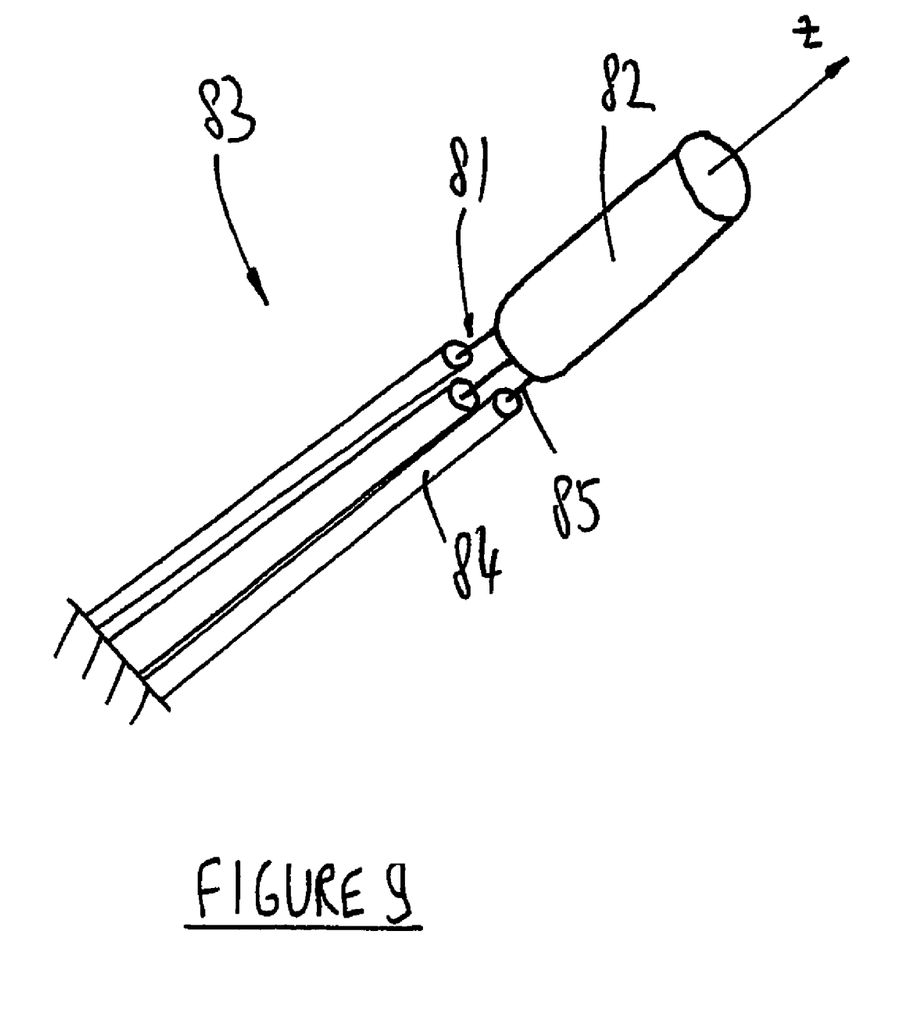
FIG. 9 shows a schematic perspective view of a further embodiment of the present inventive arrangement.

FIG. 9 presents a flexure arrangement 81 as integrated in an optical beam steering arrangement 83 terminating in a collimator 82. The beam steering arrangement 83 is provided with a number of actuators 84 terminating in flexures such as that referenced 85. The actuators 84 may be piezoelectric-actuators which flex in the Z direction when actuated. When any of the actuators is flexed but one of the others at least is not actuated or not actuated to the same degree, the collimator pivots. The supporting structure of at least one of the flexures is in this embodiment at least one of the actuators.

Figure 10:
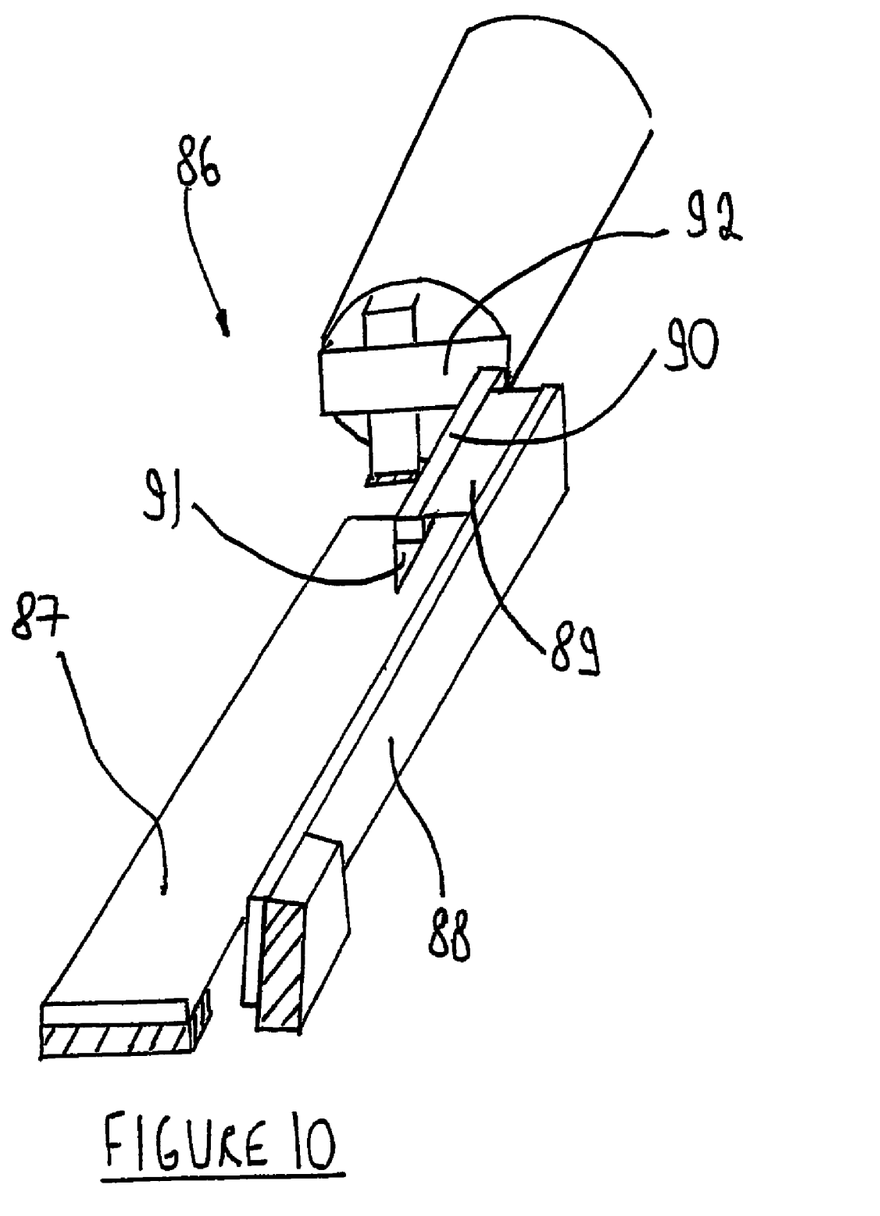
FIG. 10 shows a schematic perspective view of a further embodiment of the present inventive arrangement.

FIG. 10 illustrates a further flexure arrangement generally referenced 86 comprising one dimensional actuators 87 and 88 of the type described with reference to FIG. 8. Additional flexures 89 and 91 are provided being joined together at one extremity by a spacer 90 and fixed to their respective actuator at the other extremity. The spacer 90 engages flexure 92 which is of the kind described with reference to FIGS. 1 to 7. This arrangement is particularly advantageous in terms of achieving vibrational balance in both axes whilst employing one-dimensional actuators.

The flexure arrangements of the preceding embodiments were described as operating with a collimator. The inventive flexure arrangement may operate with other optical elements such as for example: deflective elements and gratings and is intended for use in any application where a flexure arrangement is required to support any appropriate element and transmit movement to any appropriate element—the scope of the invention being defined in the claims that follow.

The invention claimed is:

1. A flexure arrangement, suitable for use with or as part of an optical beam steering arrangement, and intended for supporting and transmitting movement to any appropriate element, the arrangement comprising:
   any appropriate supporting structure;
   means for receiving any appropriate element;
   a first flexure configuration;
   an actuator which applies movement to said first flexure configuration;
   said first flexure configuration incorporating a flexure, a first attachment on said actuator and a second attachment on said receiving means;
   a second flexure configuration incorporating a flexure, a third attachment on said receiving means and a fourth attachment on any appropriate supporting structure;
   wherein the first flexure configuration and the second flexure configuration are each compliant in two lines of movement, are non-coplanar and appropriately spaced, whereby any movement applied to said first flexure configuration causes said receiving means to displace.

2. An arrangement according to claim 1, wherein the first flexure comfiguration and the second flexure configuration incorporate plates which are substantially parallel in side view and orthogonal in plan view with respect to one another.

3. An arrangement according to claim 1, wherein the element is an optical element.

4. An arrangement according to claim 1, wherein the element is a collimator.

5. An arrangement according to claim 4, wherein the first flexure configuration and the second flexure configuration are spaced at a distance less than half of the length of the collimator.

6. An arrangement according to claim 1, wherein the element is a reflective.

7. An arrangement according to claim 1, wherein the element is a grating.

8. A beam steering arrangement, comprising:
   a flexure arrangement in accordance with claim 4; and
   an actuator for applying movement to the first flexure configuration, so that an actuator movement in any direction causes a collimator movement in the opposite direction, the relative moment of inertia of the actuator and collimator acting to counterbalance any externally induced movements.

9. An arrangement in accordance with claim 8, wherein the actuator comprises a piezoelectric actuator which when actuated displaces two dimensionally.

10. An arrangement according to claim 1, wherein the first flexure configuration is located upstream from the second flexure configuration.

11. An arrangement according to claim 1, wherein the receiving means incorporate a slot extending from the periphery to an inward portion of said receiving means, thereby facilitating any one of the ready insertion and removal of an optical fiber.

12. An arrangement according to claim 1, wherein any of the flexure configurations comprise a hole sufficient in diameter to allow the passage of an optical fiber and to avoid contact between the fiber and the flexure configuration.

13. An arrangement according to claim 1, wherein the supporting structure of the second flexure configuration is a second actuator.

14. An arrangement according to claim 4 and extending in the Z-direction, comprising at least a first and second actuator, the first flexure configuration being at least in part the extremity of said first actuator which extends in the Z-direction when actuated and the second flexure comprising means located at the extremity of said second actuator, thereby when the first actuator is actuated, the collimator pivots.

15. An optical switch comprising an arrangement in accordance with claim 1.

16. An arrangement according to claim 1, wherein said flexure configurations are compliant in both bending and torsion.

17. An arrangement according to claim 16, wherein said flexure configurations incorporate plates which space respectively the first and second attachments; and the third and fourth attachments sufficiently to allow both bending and torsion of the plates to occur.

18. An arrangement according to claim 1, wherein the actuator is a 2D power driven actuator.

* * * * *